US009009005B2

(12) United States Patent
Kuchiki et al.

(10) Patent No.: US 9,009,005 B2
(45) Date of Patent: Apr. 14, 2015

(54) LIGHTING CONTROL APPARATUS, LIGHTING CONTROL SYSTEM AND LIGHTING CONTROL METHOD

(75) Inventors: Nobuo Kuchiki, Yokohama (JP); Takashi Baba, Kawasaki (JP); Mayumi Kono, Shinagawa-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/342,341

(22) PCT Filed: Aug. 30, 2012

(86) PCT No.: PCT/JP2012/005483

§ 371 (c)(1), (2), (4) Date: Feb. 28, 2014

(87) PCT Pub. No.: WO2013/031225

PCT Pub. Date: Mar. 7, 2013

(65) Prior Publication Data

US 2014/0225510 A1 Aug. 14, 2014

(30) Foreign Application Priority Data

Sep. 1, 2011 (JP) ................................ 2011-191106

(51) Int. Cl.
*G06F 17/50* (2006.01)
*H05B 33/08* (2006.01)
*H05B 37/02* (2006.01)

(52) U.S. Cl.
CPC .............. *H05B 33/089* (2013.01); *H05B 37/02* (2013.01); *H05B 37/0245* (2013.01)

(58) Field of Classification Search
USPC ............... 703/1; 345/156, 162, 163, 571, 581
See application file for complete search history.

(56) References Cited

U.S. PATENT DOCUMENTS

2003/0009315 A1* 1/2003 Thomas et al. .................... 703/1
2003/0036983 A1* 2/2003 Hougen et al. .................. 705/28
2004/0165385 A1* 8/2004 Belliveau ...................... 362/272
2005/0131931 A1 6/2005 Kawajiri (Continued)

FOREIGN PATENT DOCUMENTS

CN 1627721 A 6/2005
JP 2005-135658 A 5/2005

(Continued)

OTHER PUBLICATIONS

International Search Report; PCT/JP2012/005483; Oct. 2, 2012.

(Continued)

*Primary Examiner* — Thuy Vinh Tran
(74) *Attorney, Agent, or Firm* — Studebaker & Brackett PC

(57) ABSTRACT

The lighting control apparatus has a memory unit, an operation input unit and a control unit. The memory unit stores an outer frame and addresses of luminaires and operating devices. The operation input unit inputs to designate a position where a small area is provided in a predetermined area on a layout drawing. The control unit provides, based on the outer frame and the addresses, a layout drawing that illustrates positions where luminaires and operating devices are arranged in the predetermined range within the outer frame. The control unit determines the luminaire and the operating device arranged in the small area. The control unit gives an operation right of the luminaire arranged in the small area to the operating device arranged in the same small area.

10 Claims, 7 Drawing Sheets

(56) References Cited

U.S. PATENT DOCUMENTS

| | | | | |
|---|---|---|---|---|
| 2005/0131991 | A1 | 6/2005 | Ogawa et al. | |
| 2006/0103627 | A1 * | 5/2006 | Watanabe et al. | 345/156 |
| 2009/0167483 | A1 * | 7/2009 | Jones et al. | 340/3.7 |
| 2010/0259615 | A1 | 10/2010 | Yamamoto | |

FOREIGN PATENT DOCUMENTS

| | | | |
|---|---|---|---|
| JP | 2005-198252 | A | 7/2005 |
| JP | 2006-020016 | A | 1/2006 |
| JP | 2009-191575 | A | 8/2009 |
| JP | 2010-251938 | A | 11/2010 |
| JP | 2011-076875 | A | 1/2011 |

OTHER PUBLICATIONS

"Notification of the First Office Action," issued by the State Intellectual Property Office of China on Oct. 10, 2014, which corresponds to Chinese Patent Application No. 201280042795.1 and is related to U.S. Appl. No. 14/342,341; with English language translation.

* cited by examiner

LIGHTING CONTROL APPARATUS, LIGHTING CONTROL SYSTEM AND LIGHTING CONTROL METHOD

CROSS REFERENCE TO RELATED APPLICATION

This application claims priority to and the benefit of Japanese Patent Application No. 2011-191106 filed on Sep. 1, 2011, the entire contents of which are incorporated herein by reference.

TECHNICAL FIELD

The present invention relates to a lighting control apparatus and a lighting control system configured to assign an operation right of a plurality of luminaires arranged in a predetermined area to a plurality of operating devices and a lighting control method thereof.

BACKGROUND

Usually a plurality of luminaires are provided on each floor of a building. Furthermore, on each floor, a plurality of rooms can be formed by combining inner wall arrangements. The luminaires arranged in a plurality of formed rooms may preferably be operated by switches and the like provided on walls and posts in the rooms.

Conventionally, it is suggested that an address of each luminaire and an address of each operating device are registered, each position on which a partition is arranged is detected by a sensor, and a luminaire and an operating device that have an address corresponding to the room formed by the partition are combined (see Patent Documents 1 and 2).

It is also generally known that, instead of providing a sensor that detects arrangements of partitions, a building manager sets an input terminal for lighting control to combine luminaires and operating devices arranged in the same room.

CITATION LIST

Patent Literature 1: JP2009-191575A
Patent Literature 2: JP2010-251938A

SUMMARY

However, a building manager would need a special knowledge to set for combining luminaires and operating devices, and it has been desired that even a user who has no knowledge of managing a lighting control can easily set a combination of luminaires and operating devices.

The present invention has been conceived in light of the above circumstances and provides a lighting control apparatus, a lighting control system and a lighting control method to enable easy setting of combination of luminaires and operating devices according to the room assignment.

The lighting control apparatus according to the present invention includes:

a memory unit configured to store a layout drawing illustrating an arrangement of a plurality of luminaires and a plurality of operating devices in a predetermined area and addresses corresponding to respective positions where the luminaires and the operating devices are arranged;

an input unit configured to input to designate a position where a small area is provided in the predetermined area on the layout drawing; and a control unit configured to determine, based on the addresses stored in the memory unit, the luminaires and the operating devices arranged in the small area designated by an input on the layout drawing, and to give an operation right of the determined luminaires to the operating devices arranged in the small area.

The control unit may preferably give a warning when at least one of the luminaire and the operating device is not arranged in the small area.

Furthermore, even if the luminaire is arranged and the operating device is not arranged in the small area, the control unit may not give a warning when a receiver corresponding to a wireless input device is arranged in the small area.

The plurality of operating devices may preferably include an operating unit provided on a wall constituting an outer periphery of the predetermined area or on a post.

Furthermore, the plurality of operating devices may preferably include an operation terminal associated with a predetermined position in a first area.

The control unit may preferably display and output the layout drawing and, to the layout drawing displayed and outputted, accept, from the input unit, the designation input of the position where the small area is arranged.

Furthermore, the control unit may preferably display and output the layout drawing and, to the layout drawing displayed and outputted, the input unit is a pointing device.

Moreover, the control unit may preferably accept an area designated by a drag operation from the pointing device as the designation input of the position where the small area is arranged.

A lighting control system according to the present invention includes:

a plurality of luminaires;

a plurality of operating devices;

a memory unit configured to store a layout drawing illustrating an arrangement of a plurality of luminaires and a plurality of operating devices in a predetermined area and addresses corresponding to respective positions where the luminaires and the operating devices are arranged;

an input unit configured to input to designate a position where a small area is provided in the predetermined area on the layout drawing; and a control unit configured to determine, based on the addresses stored in the memory unit, the luminaires and the operating devices arranged in the small area designated by an input on the layout drawing, and to give an operation right of the determined luminaires to the operating devices arranged in the small area.

A lighting control method according to the present invention includes steps of:

displaying and outputting a layout drawing illustrating an arrangement of a plurality of luminaires and a plurality of operating devices in a predetermined area;

inputting to designate a position where a small area is provided in the predetermined area on the layout drawing;

determining, based on addresses, stored in advance, corresponding to respective positions where the luminaires and the operating devices are arranged in the predetermined area, the luminaires and the operating devices arranged in the small area designated by an input on the layout drawing; and giving an operation right of the determined luminaires to the operating devices arranged in the small area.

A lighting control apparatus according to the present invention configured as described above designates a position where a small area is arranged on a layout drawing, thus an operation right of luminaires in the small area is given to operation devices in the same small area, thereby enabling assignment of an operation right of the luminaires to the operating devices in a simple manner.

DESCRIPTION OF EMBODIMENTS

The embodiment of the lighting control apparatus to which the present invention is applied will be described below with reference to the accompanying drawings.

Figure 1:
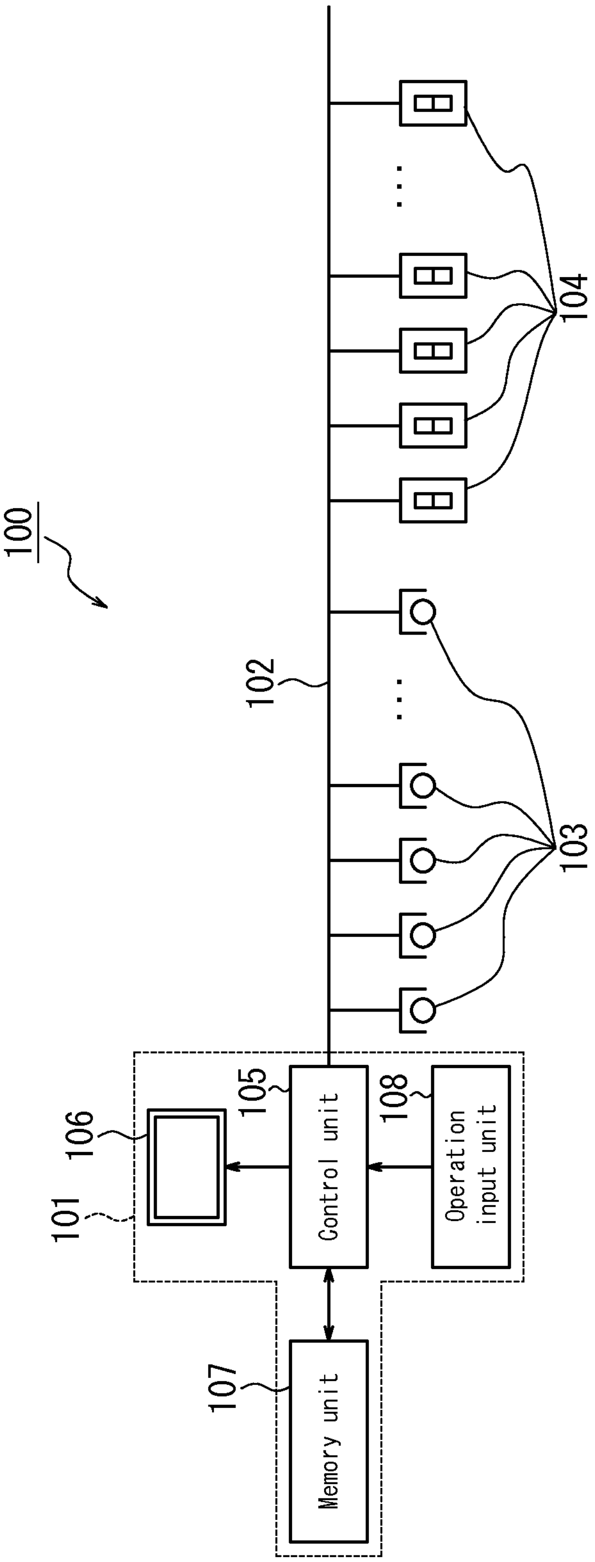
FIG. 1 is a block diagram illustrating a configuration of a lighting control system having a lighting control apparatus according to one embodiment of the present invention.

FIG. 1 is a block diagram illustrating a configuration of a lighting control system having a lighting control apparatus according to one embodiment of the present invention. The lighting control system 100 is constituted by including a lighting control apparatus 101, a signal transmission line 102, a luminaire 103 and an operating device 104. The lighting control apparatus 101, a plurality of luminaires 103 and a plurality of operating devices 104 are connected via the signal transmission line 102.

The luminaire 103 has an illumination light source such as, for example, an LED light source, and can switch between light emission and extinction. In addition, the amount of illumination light can be adjusted. The operating device 104 is, for example, a switch for switching between light emission/extinction of the luminaire 103, a wall-mounted operation unit (fixed operation unit) having a dial for adjusting the amount of illumination light, or a wireless input terminal (operation terminal) having a changeover switch or a function for adjusting the amount of light and an operation means for adjustment. Operation input to any one of the luminaires 103 can be detected by the operating device 104.

As described below, the lighting control apparatus 101 enables setting of assignment of an operation right of each luminaire 103 to an operating devices 104. Assignment of an operation right of the luminaire 103 to the operating device 104 enables, based on an operation input thereto, switching between light emission/extinction or adjustment of the amount of light of the luminaire 103 of which the operation right is assigned.

Next, arrangement of luminaires 103 and operating devices 104 will be described. The lighting control system 100 is applied, for example, to the lighting of the whole building or of a specific floor of the building. A plurality of luminaires 103 and a plurality of operating devices 104 are respectively arranged on a specific position on a specific floor of the building. In the present embodiment, for example, luminaires 103 and operating devices 104 in any building are included in the lighting control system 100. A building manager may form small areas or passages in areas by using inner walls or partitions. In this case, the small area may not necessarily be a sealed space, and may be a space having an opening portion and surrounded by a partition.

The wall-mounted operation unit is arranged on the inner face of outer wall of the building or on the surface of posts inside the building. In addition, a receiver (access point and the like) configured to receive wireless signals (wireless LAN and the like) from the wireless input terminal is arranged on a predetermined position. For convenience of explanation, the position where a wireless input terminal is arranged refers to a position where a receiver that has registered the position of the wireless input terminal is arranged.

Next, a configuration of the lighting control apparatus 101 will be described. The lighting control apparatus 101 is constituted by including a control unit 105, a monitor 106, a memory unit 107 and an operation input unit 108 (pointing device such as a keyboard, a mouse and a touch panel).

Figure 2:
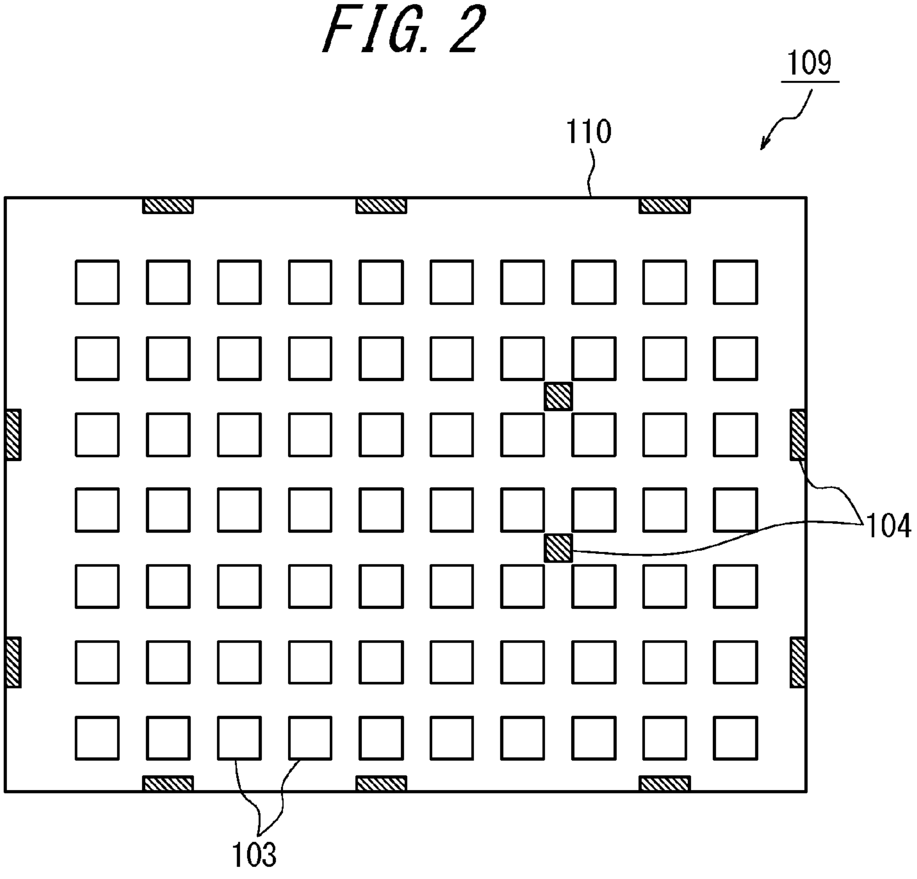
FIG. 2 is a layout drawing of luminaires and operating devices in a predetermined area.

The monitor 106 of the lighting control apparatus 101 displays a layout drawing 109 of luminaires 103 and operating devices 104 in a specific area, which is an area in which the lighting control system 100 is used (see FIG. 2). In the layout drawing 109, the positions where the luminaires 103 and the operating devices 104 are arranged in the predetermined area are managed by coordinates on a two-dimensional plane and illustrated within an outer frame 110 also managed by coordinates, which represents a boundary of the predetermined area. When the lighting control system 100 is applied to a plurality of floors of the building, each floor's layout drawing is displayed by a two-dimensional coordinate system. Moreover, in addition to the information on the two-dimensional coordinate, the information on the belonging floor is added to the information on the positions where each luminaire 103 and operating device 104 are arranged.

In order to display a layout drawing, in the memory unit 107, the outer frames 110 indicating a boundary of the predetermined area on floors of the building and addresses indicating a position (information on coordinates on two-dimensional plane and belonging floor) of each luminaire 103 and each operating device 104 within each outer frame 110 are stored in advance. The control unit 105 provides a layout drawing based on the outer frames 110 and the addresses of the luminaires 103 and of the operating devices 104 within the outer frame stored in the memory unit 107 and displays the drawing on the monitor 106.

The lighting control apparatus 101 has a device assignment mode. In the device assignment mode, based on an input to the operation input unit 108, the control unit 105 assigns an operation right of each luminaire 103 to an operating device 104. When the device assignment mode is selected, the control unit 105 can accept an operation input of depicting a small area on the layout drawing 109 and an operation input of executing an assignment.

Figure 3:
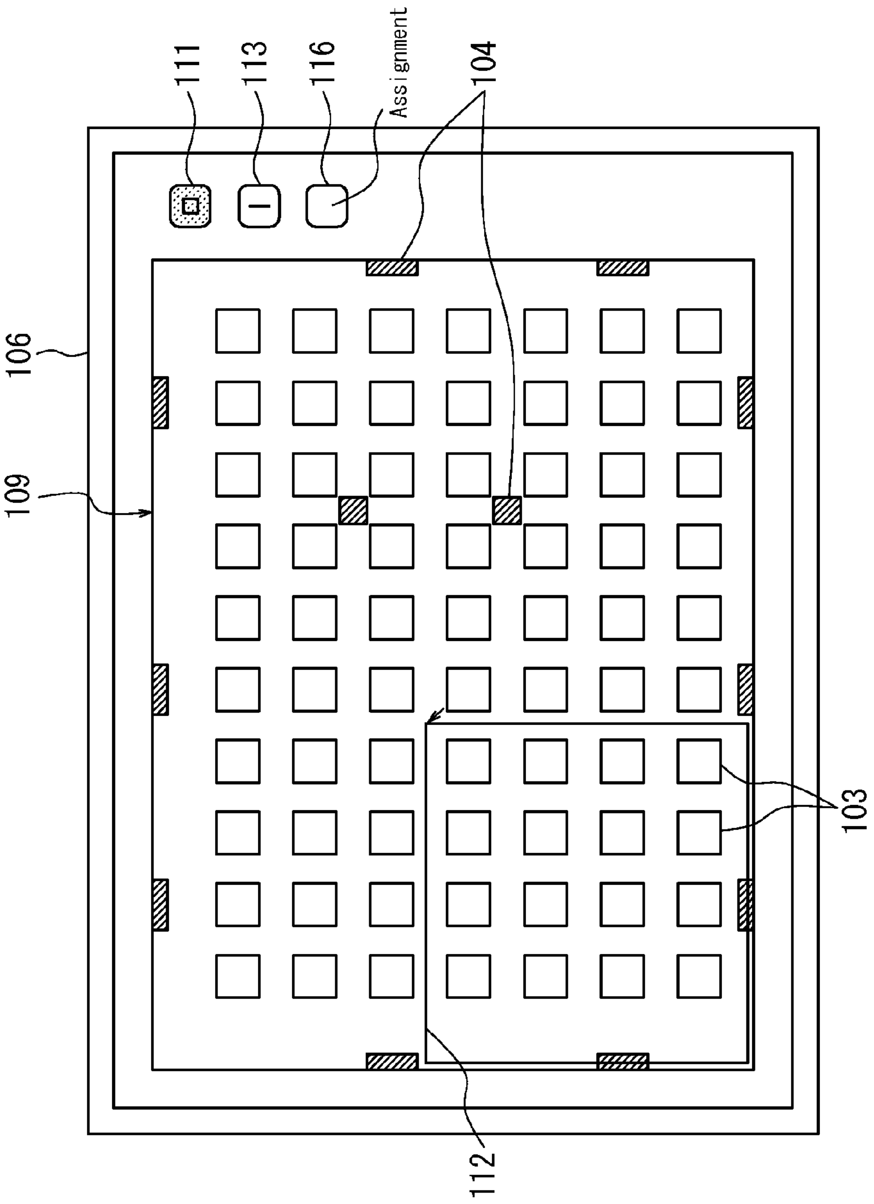
FIG. 3 is a diagram illustrating a method of depicting a small area when a small area icon is clicked.

For example, as illustrated in FIG. 3, when recognizing an operation input of clicking a small area icon 111 displayed on the monitor 106 in the device assignment mode, the control unit 105 waits for a drag operation on the same two-dimensional coordinate system as that indicating positions of the luminaires 103 and the operating devices 104. That is, in the device assignment mode, the control unit 105 displays a layout drawing indicating positions of the luminaires 103 and the operating devices 10 on the monitor 106 and virtually expands a coordinate system that corresponds to the two-dimensional coordinate system for indicating their positions on the monitor as well, thus transiting to a state ready to accept a range designation of the small area 112. When a drag operation for range designation is performed by a mouse and the like on the monitor, the control unit 105 recognizes a rectangle with a pair of vertices, a coordinate of the starting point and a coordinate of the ending point of the drag operation, as a range designated as the small area 112, and depicts the range on the layout drawing. Thus the control unit 105 recognizes the range of area designated by the two-dimensional coordinate system as the small area 112. Even if the drag operation ends, the control unit 105 does not accept the end of drag operation when determining that a wall forming a small area 112 indicated by the ending coordinate is the luminaire 103. Then when recognizing a click operation again on the position that does not overlap with the luminaire 103, the control unit accepts the end of the drag operation.

Figure 4:
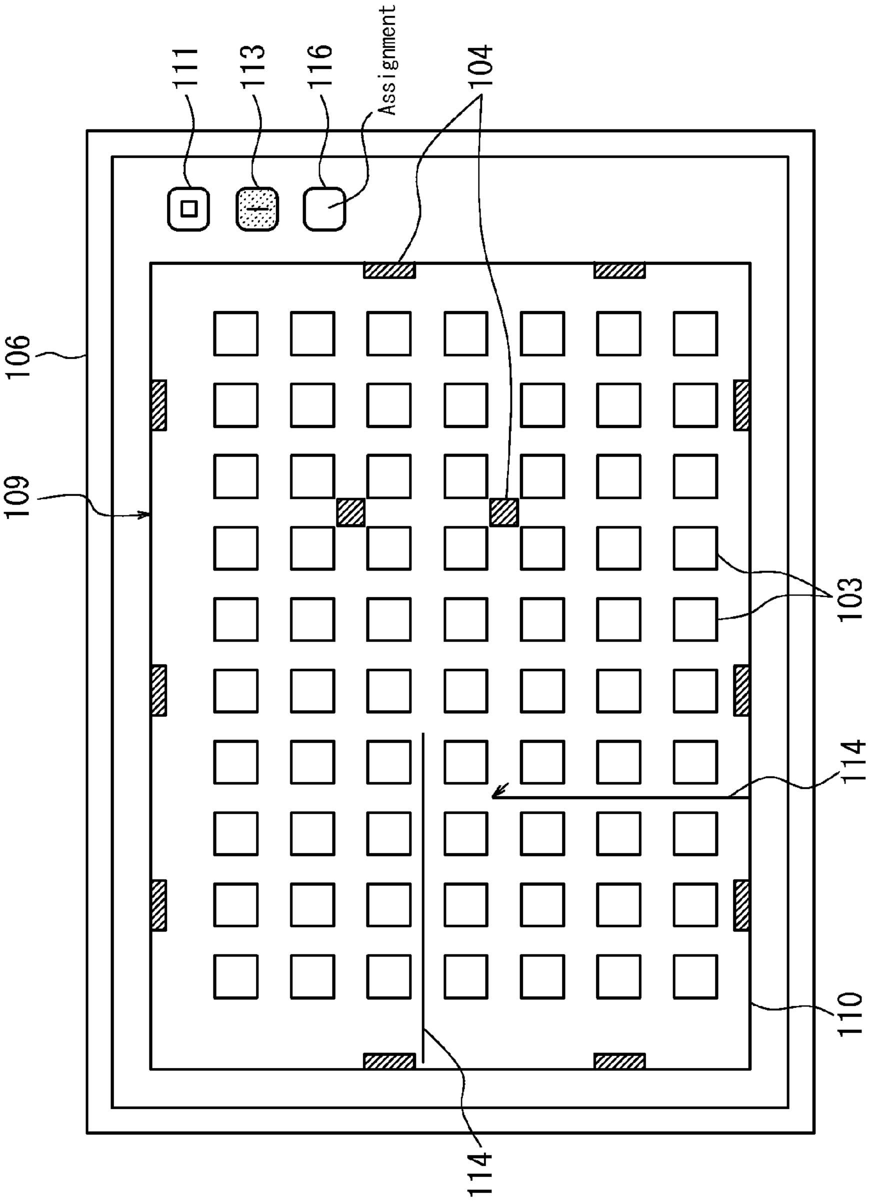
FIG. 4 is a diagram illustrating a method of depicting the small area when a wall icon is clicked.

Furthermore, as illustrated in FIG. 4, when recognizing an operation input of clicking a wall icon 113 displayed on the monitor 106, the control unit 105 transits to a state ready to accept the operation input of depicting a wall by drag. The control unit 105 recognizes a line connecting between the coordinate at the starting point of the recognized drag operation and the coordinate at the end point thereof as a wall 114, and depicts the wall 114 on the layout drawing. When the wall 114 overlaps with the luminaire 103, the control unit 105 does not accept the start and the end of the drag operation as in the above-described case. The control unit 105 forms an area closed by a plurality of walls 114 and the outer frame 110, thereby completing a depicting operation of small area 112.

Figure 5:
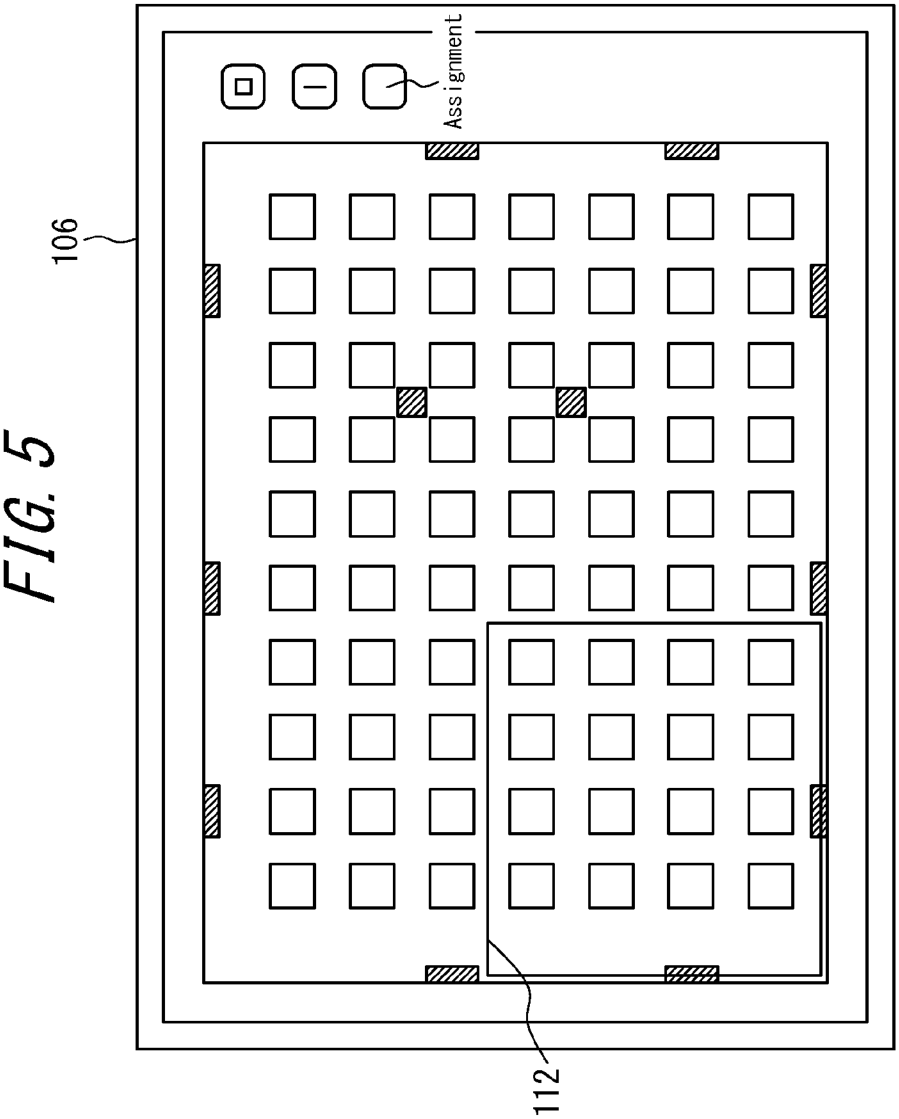
FIG. 5 is a layout drawing illustrating a state where the small area is depicted in the predetermined area.
Figure 6:
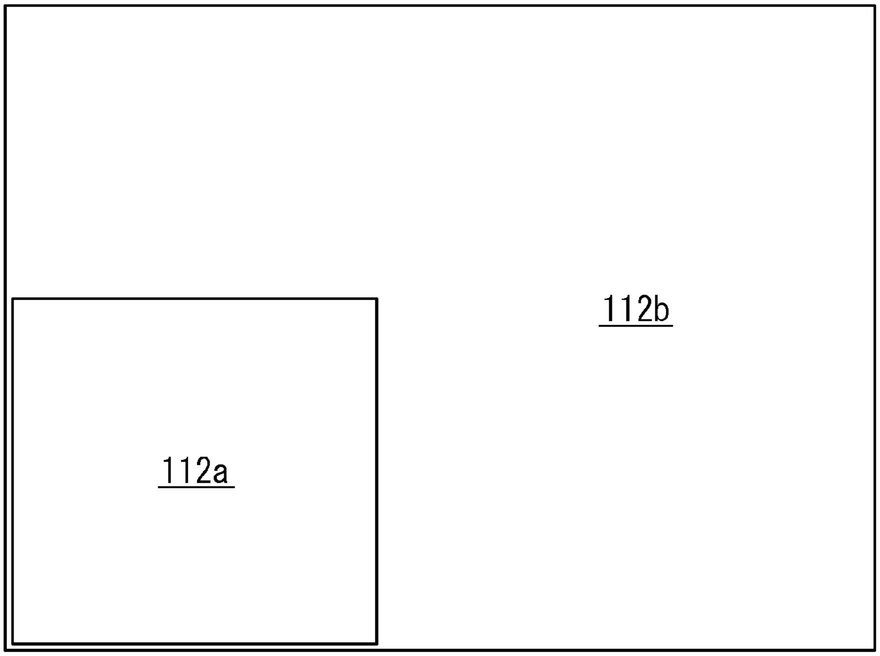
FIG. 6 is a diagram illustrating a small area recognized with respect to the small area depicted in FIG. 5.

Moreover, the control unit 105 recognizes an area other than the depicted small area 112 as another small area 112. For example, as illustrated in FIG. 5, when a range of small area 112 is designated in a part of the predetermined area, the control unit 105 recognizes the designated range as a first small area 112*a* as illustrated in FIG. 6, and the remaining range as a second small area 112*b* as well.

Figure 7:
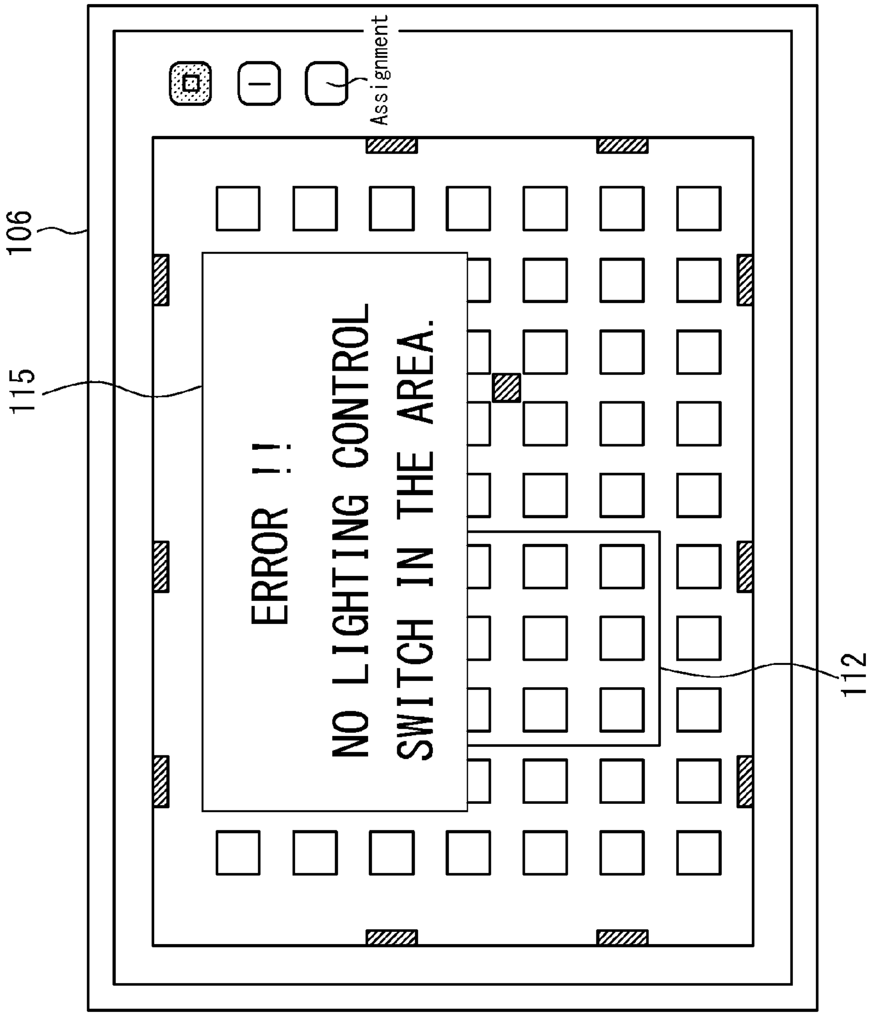
FIG. 7 is a diagram illustrating a state where a warning is displayed when a luminaire and an operating device are not arranged in the depicted small area.

Each time a small area 112 is depicted, the control unit 105 determines whether or not at least one luminaire 103 and at least one operating device 104 are arranged in each of the recognized small areas 112. When determining that either one of them is not present in the small areas 112, the control unit 105 displays a warning thereof on the monitor 106 as illustrated in FIG. 7, for example. Further, the control unit 105 deletes the warning 115 by, for example, deleting the depicted small area 112 later. FIG. 7 illustrates an example where a luminaire 103 is included in the area designated as a small area 112, but an operating device 104 is not included therein.

In the case where even a wireless input terminal (operation terminal) is also considered, the control unit 105 also determines, when determining whether or not a luminaire 103 and an operating device 104 are arranged in each small area 112, whether a receiver and a wireless input terminal whose position is registered in the receiver are present even there is no operating device 104. Furthermore, even if a small area does not have an operating device 104 the control unit 105 does not give a warning if there are a receiver and a wireless input terminal whose position is registered in the receiver in the small area. The control unit 105 gives a warning when there is neither an operating device 104 nor a receiver, or when there is a receiver but there is no wireless input terminal whose position is registered in the receiver in the small area 112.

Next, when the control unit 105 recognizes an operation input of clicking the assignment icon 116 (see FIGS. 3 and 4) displayed, for example, on the monitor 106 after a small area 112 is depicted, it starts to assign an operation right of each luminaire 103 to operating devices 104. When starting the assignment, the control unit 105 recognizes luminaires 103 and operating devices 104 arranged in the depicted small area 112.

Note that when the above-described receiver is provided, the memory unit 107 stores the information on the position where the receiver is arranged (two-dimensional coordinate and the belonging floor) in advance. Then the control unit 105 also displays a receiver on the layout drawing based on the information on the position where the receiver is arranged, and recognizes the receiver included in the coordinate range of each small area 112 designated on the layout drawing. Thus the control unit 105 stores the receiver as that corresponding to each small area in the memory unit 107.

Thereafter the control unit 105 gives an operation right of luminaires 103 arranged in the small area 112 to the operating device(s) 104 recognized as arranged in the same small area 112. Giving of an operation right is performed for each small area 112. In this case, the control unit 105 associates each operating device 104 with an address of luminaire 103 from which an operation right is assigned thereto, and stores the corresponding relation therebetween in the memory unit 107. When a plurality of operating devices 104 are arranged in a single small area 112, the control unit 105 gives an operation right of all luminaires 103 in the small area to all operating devices 104 in the same small area 112.

In this case, it is possible to allow the control unit 105, even after automatic assignment of an operation right of all luminaires 103 to all operating devices 104 in the single small area 112, to assign an operation right of a luminaire 103 on a predetermined position to each operating device 104 by input to an operation input unit 108 after the automatic assignment of an operation right.

According to the lighting control apparatus of the present embodiment configured in the above-described manner, a small area 112 depicted on the layout drawing 109 that visualizes arrangement of luminaires 103 and operating devices 104 controlled by a lighting control apparatus 101 in a predetermined area can be depicted on a monitor 106 so that it is visually recognized and, by designating a range to be a small area 112 on the monitor, an operation right of luminaires 103 in a designated range is automatically assigned to operating devices 104 in the same range. Thus even a user without expertise can easily and intuitively assign an operation right of luminaires 103.

Thereafter when a user in any one of small areas performs an operation input to switch between light extinction and emission or to change the luminance using an operating device 104 arranged in the area, the control unit 105 refers to the memory unit 107. Then the control unit 105 locates, based on the reference, the address of the luminaire 103 associated with the operated operating device 104, and performs switching between light extinction and emission and changing of the luminance of the luminaire 103 having the located address. Thus, regardless of any partition into small areas, it is certain that each operating device 104 is given an operation right of a luminaire 103 that is in the same room as the operating devices 104.

Further, according to the lighting control apparatus of the present embodiment, a warning is displayed when at least one luminaire 103 and at least one operating device 104 are not arranged in a depicted small area 112, thus at least one luminaire 103 can be arranged in small areas 112 and an operating device 104 that can operate each arranged luminaire 103 can be arranged therein as well.

Although the present invention has been described based on drawings and the embodiment, it should be noted that a person skilled in the art can easily perform various variations or modifications based on the disclosure. Therefore it should be noted that such variations or modifications are included in the scope of the present invention.

For example, in the above-described embodiment, an ID may be given to each user in advance and a user who may operate in a device assignment mode can be managed by the ID and can be stored in the memory unit 107. Further, ranges where an operation in a device assignment mode is allowed or floors on which an operation is allowed may vary with IDs. In this case, when the control unit 105 detects an input of a predetermined ID by a user, it allows the user to operate in a device assignment mode only in the range or on the floor corresponding to the ID, and displays the area to be operated on the monitor 106. With such a configuration, only a user who has a predetermined authority may assign an operation right of a luminaire 103 on a predetermined position to an operating device 104. For more concrete example, when one floor is partitioned into small sections and each section is lent to different stores, or when each floor is lent to different companies, assignment of luminaires can be changed, with a simple operation, by respective stores or companies only for the range lent to each store or company.

Although the example shows that the operation input unit 108 and the monitor 106 are provided one for each control unit 105 and memory unit 107, they may be provided more than one for each. Furthermore, the operation input unit 108 and the monitor 106 may be used as a display screen and an operation means of a wireless input terminal such as a smart phone. In this case, operation input is performed by connecting, via the Internet or the Intranet, to a server having a control unit 105 and a memory unit 107.

REFERENCE SIGNS LIST

100 Lighting control system
101 Lighting control apparatus
102 Signal transmission
103 Luminaire
104 Operating device
105 Control unit
106 Monitor
107 Memory unit
108 Operation input unit
109 Layout drawing
110 Outer frame
111 Small area icon
112 Small area
112*a* First small area
112*b* Second small area
113 Wall icon
114 Wall
115 Warning
116 Assignment icon

The invention claimed is:

1. A lighting control apparatus comprising:

a memory unit configured to store a layout drawing illustrating an arrangement of a plurality of luminaires and a plurality of operating devices in a predetermined area and addresses corresponding to respective positions where the luminaires and the operating devices are arranged;

an input unit configured to input to designate a position where a small area is provided in the predetermined area on the layout drawing; and a control unit configured to determine, based on the addresses stored in the memory unit, the luminaires and the operating devices arranged in the small area designated by an input on the layout drawing, and to give an operation right of the determined luminaires to the operating devices arranged in the small area.

2. The lighting control apparatus according to claim 1, wherein the control unit gives a warning when at least one of the luminaire and the operating device is not arranged in the small area.

3. The lighting control apparatus according to claim 2, wherein, even if the luminaire is arranged and the operating device is not arranged in the small area, the control unit does not give a warning when a receiver corresponding to a wireless input device is arranged in the small area.

4. The lighting control apparatus according to claim 1, wherein the plurality of operating devices include an operating unit provided on a wall constituting an outer periphery of the predetermined area or on a post.

5. The lighting control apparatus according to claim 1, wherein the plurality of operating devices include an operation terminal associated with a predetermined position in an area.

6. The lighting control apparatus according to claim 1, wherein the control unit displays and outputs the layout drawing and, with respect to the layout drawing displayed and outputted, accepts by the input unit an input to designate the position where the small area is arranged.

7. The lighting control apparatus according to claim 1, wherein the control unit displays and outputs the layout drawing and, the input unit is a pointing device to the layout drawing displayed and outputted.

8. The lighting control apparatus according to claim 7, wherein the control unit accepts an area designated by a drag operation from the pointing device as an input to designate the position where the small area is arranged.

9. A lighting control system comprising:

a plurality of luminaires;

a plurality of operating devices;

a memory unit configured to store a layout drawing illustrating an arrangement of a plurality of luminaires and a plurality of operating devices in a predetermined area and addresses corresponding to respective positions where the luminaires and the operating devices are arranged;

an input unit configured to input to designate a position where a small area is provided in the predetermined area on the layout drawing; and a control unit configured to determine, based on the addresses stored in the memory unit, the luminaires and the operating devices arranged in the small area designated by an input on the layout drawing, and to give an operation right of the determined luminaires to the operating devices arranged in the small area.

10. A lighting control method comprising steps of:

displaying and outputting a layout drawing illustrating an arrangement of a plurality of luminaires and a plurality of operating devices in a predetermined area;

inputting to designate a position where a small area is provided in the predetermined area on the layout drawing;

determining, based on addresses, stored in advance, corresponding to respective positions where the luminaires and the operating devices are arranged in the predetermined area, the luminaires and the operating devices arranged in the small area designated by an input on the layout drawing; and giving an operation right of the determined luminaires to the operating devices arranged in the small area.

* * * * *